United States Patent [19]
Yoshida

[11] 4,409,668
[45] Oct. 11, 1983

[54] ROUND-OFF APPARATUS FOR DATA PROCESSORS

[75] Inventor: Junichi Yoshida, Tachikawa, Japan

[73] Assignee: Casio Computer Co., Ltd., Tokyo, Japan

[21] Appl. No.: 242,142

[22] Filed: Mar. 9, 1981

[30] Foreign Application Priority Data

Mar. 24, 1980 [JP] Japan ................................ 55-37223

[51] Int. Cl.³ ............................................. G06F 7/48
[52] U.S. Cl. ................................................. 364/745
[58] Field of Search ............................... 364/745, 748

[56] References Cited

U.S. PATENT DOCUMENTS

| | | | |
|---|---|---|---|
| 3,594,565 | 7/1971 | Ragen | 364/745 |
| 4,110,831 | 8/1978 | Langdon, Jr. | 364/745 |
| 4,149,261 | 4/1979 | Harigaya et al. | 364/745 |

*Primary Examiner*—David H. Malzahn
*Attorney, Agent, or Firm*—Frishauf, Holtz, Goodman & Woodward

[57] ABSTRACT

A round-off type of numeric data display apparatus which has at least X, Y, Z and K registers, and which stores in said X register a previous data item obtained by a previous one of arithmetic operations convergently producing a result in turn, stores in said Y register an immediately succeeding data item obtained by an immediately succeeding one to said previous one of said arithmetic operations, stores in said K register that number of digit-place data items to be rounded-off of said immediately succeeding data item which has been obtained by the arithmetic operation in an arithmetic-operational section connected to said X, Y, Z and K registers, subjects said immediately succeeding data item to rounding-off operation in said arithmetic-operational section on the basis of the contents item of said K register and stores the result of said rounding-off operation in said Z register, transfers the contents item of said Z register and a decimal point code of said Y register to a display buffer connected to said Y and Z registers, and displays only numeric data of reliable digit-place number from a display section connected to said display buffer.

4 Claims, 9 Drawing Figures

FIG. 5A

| $X_{VT}$ | 0 | 0 | 0 | 0 | 0 | 0 | 0 | 9 | 0 | 0 | 0 | ~28 |
|---|---|---|---|---|---|---|---|---|---|---|---|---|
| K | 1 ~34 | | | | | | | | | | | |

FIG. 5B

| $X_{VT}$ | 0 | 9 | 0 | 0 | 0 | 0 | 0 | 0 | 0 | 0 | 0 | ~28 |
|---|---|---|---|---|---|---|---|---|---|---|---|---|
| K | 4 ~34 | | | | | | | | | | | |

FIG. 5C

| $Z_{VT}$ | 0 | 1 | 2 | 3 | 4 | 0 | 0 | 2 | 0 | 0 | 0 | ~32 |
|---|---|---|---|---|---|---|---|---|---|---|---|---|
| $Y_{VT}$ | 0 | 14 | 0 | 0 | 0 | 0 | 0 | 0 | 0 | 0 | 0 | ~30 |
| K | 4 ~34 | | | | | | | | | | | |

FIG. 5D

| $Z_{VT}$ | 15 | 15 | 15 | 15 | 1 | 2 | 3 | 4 | 0 | 0 | 2 | ~32 |
|---|---|---|---|---|---|---|---|---|---|---|---|---|
| $Y_{VT}$ | 0 | 0 | 0 | 0 | 14 | 0 | 0 | 0 | 0 | 0 | 0 | ~30 |
| K | 0 ~34 | | | | | | | | | | | |

FIG. 5E

| $Z_{VT}$ | 15 | 15 | 15 | 15 | 15 | 1 | 2 | 3 | 4 | 0 | 0 | ~32 |
|---|---|---|---|---|---|---|---|---|---|---|---|---|
| $Y_{VT}$ | 0 | 0 | 0 | 0 | 0 | 14 | 0 | 0 | 0 | 0 | 0 | ~30 |

ROUND-OFF APPARATUS FOR DATA PROCESSORS

The present invention relates to a round-off apparatus for data processors which is capable of arithmetic operation convergently to produce a result in turn, the numeric data of said result being displayed, and more particularly, to such an apparatus of the type wherein display is made of only reliable items of such numeric data.

Generally, when calculating the value of a function f(x) by an electronic desk top calculator, specified arithmetic operations are repeatedly carried out in accordance with, for example, the Taylor's theorem. For example, the function $f(x)=1/(1-x)$ can be expanded as follows in accordance with the Taylor's theorem.

$$1/(1-x)=1+x+x^2+x^3+ \tag{1}$$

In case of $x=0.3$, when calculating using the approximate equation of (1), the results of the first arithmetic operation $f_1$, of the second arithmetic operation $f_2$, of the third arithmetic operation $f_3$, . . . will be as follows.

$f_1 = 1$
$f_2 = 1.3$
$f_3 = 1.39$
$f_4 = 1.417$
$f_5 = 1.4251$
$f_6 = 1.42753$
$f_7 = 1.428259$
$f_8 = 1.4284777$
$f_9 = 1.42853921$

.
.
.

As seen from $f_1$ to $f_9$, of two successive ones of the foregoing arithmetic operations the result of a later one is higher in precision than that of the preceding one. That is, the result of $f_2$ is more precise than that of $f_1$ while the result of $f_3$ more precise than that of $f_2$. Accordingly, as specified arithmetic operations or calculations are repeatedly carried out, there are convergently obtained the results which are sequentially higher in precision.

In these type of calculations, however, it is impossible to obtain a final complete result by carrying out an infinite number of such calculations. For this reason, the desk top calculator is arranged to execute the above calculation a specified number of times and display the numeric data thus obtained, by means of a numeric data display means. Conventionally, since this display was merely of the numeric data obtained as the result of the above specified calculations, it was impossible to read from the display up to what place the numeric data was effective and whether it was reliable. A highly precise calculation thus failed.

Accordingly, the object of the invention is to provide a numeric data display apparatus of the type wherein display is made of only reliable numeric data.

SUMMARY OF THE INVENTION

In accordance with the invention, a round-off apparatus for data processors which carry out a series of arithmetic operations to approach a solution with increasing degrees of accuracy, the rounding-off apparatus comprises first storage means for storing the (i)th result of a series of arithmetic operations of a data processor by which a solution is gradually approached with increasing degrees of accuracy; second storage means for storing the (i+1)th result of said series of arithmetic operations; detecting means coupled to said first and second storage means for computing difference between said (i)th result and said (i+1)th result and detecting the highest non-zero digit (n) of the computed difference; third storage means coupled to said detecting means for storing said highest non-zero digit (n); and rounding-off means coupled to said second and third storage means for rounding-off said (i+1)th result to the (n+1)th digit.

According to a further feature of the invention, the round-off apparatus further comprises display means coupled to said rounding-off means for displaying said rounded-off (i+1)th result only from the most significant digit to the (n+1)th digit.

Accordingly, when computation according to the invention is made of the above-mentioned function $f(x)=1/(1-x)$ where $x=0.3$, the following conclusions are obtained.

When considering $f_6$ and $f_7$, the data are reliable up to 1.42. When considering $f_8$ and $f_9$, the data are found reliable up to 1.428. Accordingly, when the values of the function up to $f_6$ have been determined in accordance with the invention, display is made of 1.42. In the case of up to $f_9$, display is made of 1.428. As a consequence, the invention permits the display of its arithmetic operational results up to their effective and reliable places.

By way of example and to make the description more clear, reference is made to the accompanying drawings.

BRIEF DESCRIPTION OF THE DRAWINGS

FIGS. 5A to 5E show the contents of X, Y, Z and K registers after the execution of the operational steps $S_1$, $S_6$, $S_8$ and $S_9$ in the flow chart shown in FIG. 4.

DETAILED DESCRIPTION

Figure 1:
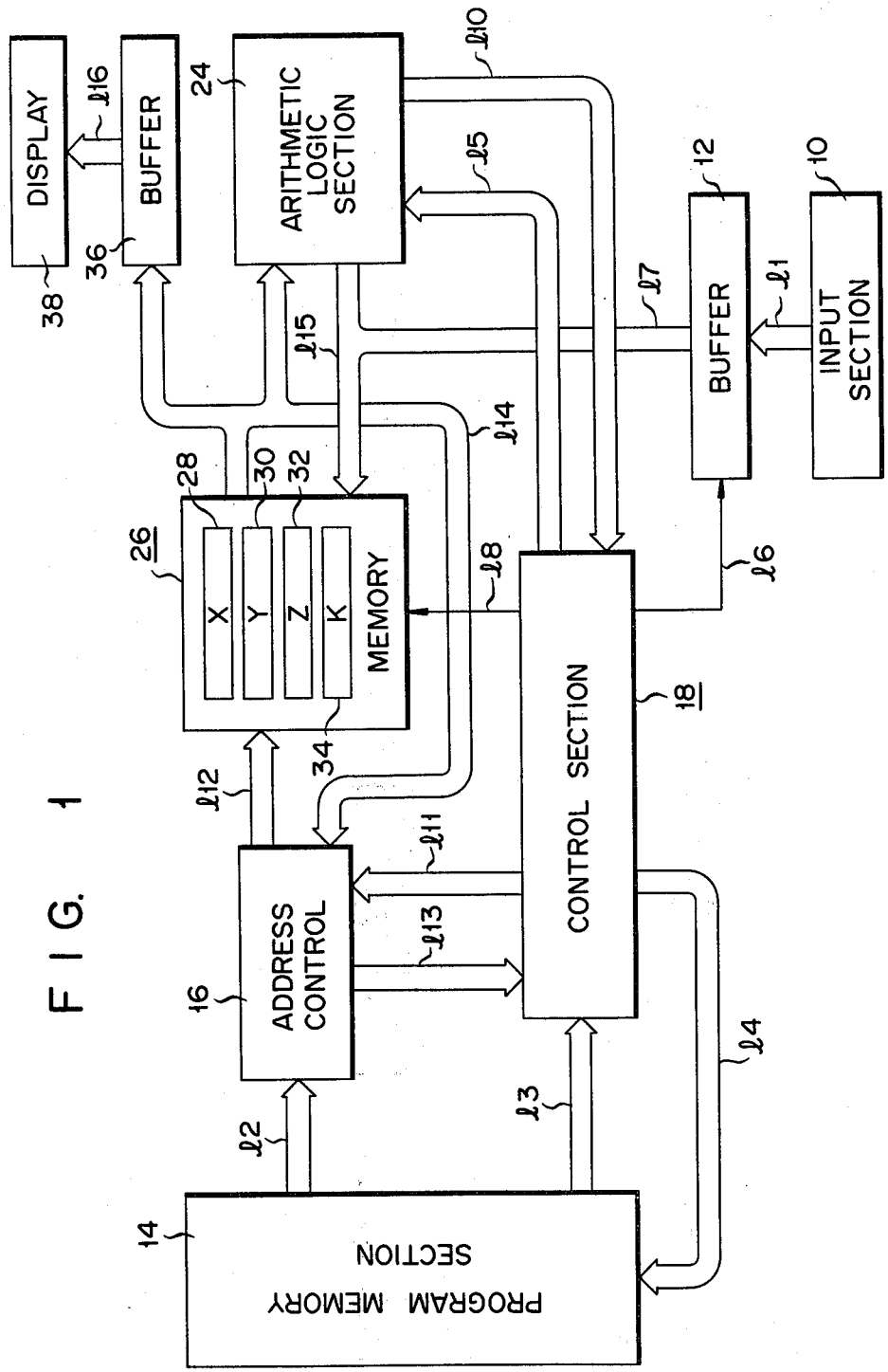
FIG. 1 is a block diagram schematically showing the construction of an embodiment wherein a numeric data display apparatus of the invention is applied to an electronic desk top calculator.

FIG. 1 is a block diagram schematically showing the construction of an embodiment wherein a numeric data display apparatus of the invention is used with an electronic desk calculator.

An input section 10 comprises a ten key section, arithmetic key and function key for executing various arithmetic operations such as, for example, function calculations. The input section 10 is connected to an input buffer 12 through a line 11. The operation signal of the input section 10 is supplied to the input buffer 12 through the line 11.

A program memory section 14 has various microinstructions stored therein. It is connected to an address control section 16 through a line 12 and also connected to a control section 18 through a line 13. The program memory section 14 supplies an address signal to the address control section 16 through the line 12. It also supplies an operation code as well as a "next" address signal for designating the next address in it to the control section 18 through the line 13.

Figure 2:
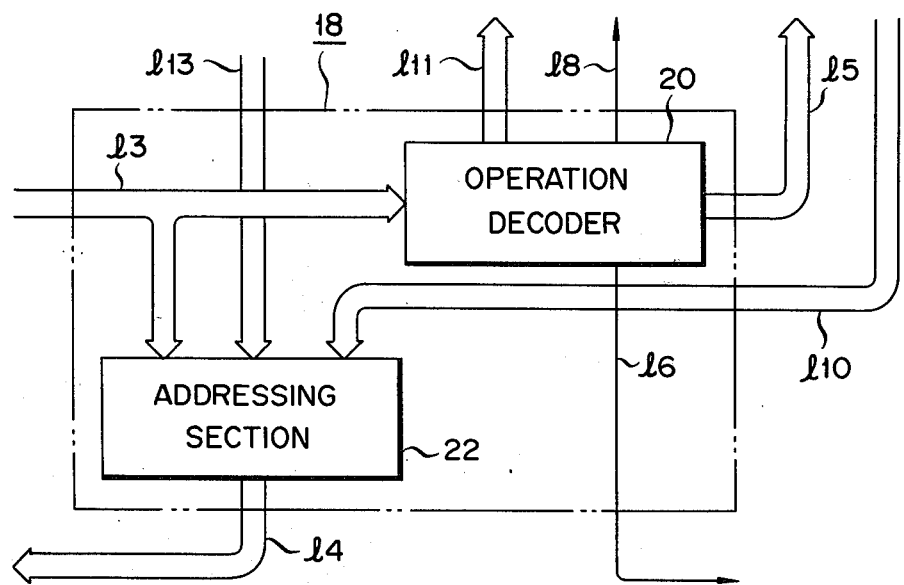
FIG. 2 is a detailed view of the construction of a control section 18 shown in FIG. 1.

FIG. 2 is a detailed view of the construction of the control section 18. This section comprises an operation decoder 20 and an addressing section 22. The line 13 is connected to the operation decoder 20 and the addressing section 22. The operation code and "next" address signal which are outputted from this line are supplied to the operation decoder 20 and addressing section 22, respectively.

The operation decoder 20 is connected to an arithmetic-logic section 24 through a line 15. It decodes the operation code and supplies to the section 24 a designating signal which designates the type of arithmetic operations such as addition, subtraction, etc. The operation decoder 20 is connected to the input buffer 12 through a line 16 and supplies a read signal to the input buffer 12 through this line. When this read signal has been inputted to the input buffer 12 connected to a memory section 26 through a line 17, the data previously stored in the input buffer 12 is transferred to the memory section 26 through the line 17. Further, the operation decoder 20 is connected to the memory section 26 through a line 18 and supplies a read/write signal to the memory section through the line 18. The operation decoder 20 is connected to the address control section 16 through a line 111 and supplies a signal designating the count-up or count-down operation to an address counter (not shown) in the address control section 16 through the line 111.

The addressing section 22 is connected to the arithmetic-logic section 24 through a line 110 and also connected to the program memory section 14 through the line 14. The addressing section 22 determines the next address in accordance with the above-mentioned "next" address signal applied through the line 13, the data signal and the signal indicating the presence or absence of a carry signal both of which are applied thereto through the line 110, and supplies that next address to the program memory section 14 through the line 14.

The address control section 16 is connected to the memory section 26 through the line 112 and also connected to the addressing section 22 through the line 113. The address control section 16 designates the address of the memory section 26 through the line 112 and, when such address designation is completed, supplies an end signal to the addressing section 22 through the line 113.

The memory section 26 is connected to the address control section 16 through a line 114, via which the data previously stored in the memory section 26 is supplied to the address control section 16. This address control section 16 makes an address designation in accordance with the data supplied as above. The memory section 26 comprises at least X register 28, Y register 30 and Z register 32 used for arithmetic operations and display as well as K register 34 used for storing the place data of a digit subjected to the rounding operation. Each of the registers (28, 30, 32 and 34) of the memory section 26 is connected to the arithmetic-logic section 24, the data in each of them being thus transferred to the same. The Y and Z register (30, 32) in the memory section 26 are connected to a display buffer 36, to which are delivered the data in the Y and Z registers (30, 32).

The arithmetic-logic section 24 is connected to the memory section 26 through a line 115. It performs each designated or specified arithmetic operation and transfers the result of it to the memory section 26 through that line.

The display buffer 36 is connected to a display section 38 through a line 116, through which the data stored in the buffer 36 is supplied to the section 38.

Figure 3:
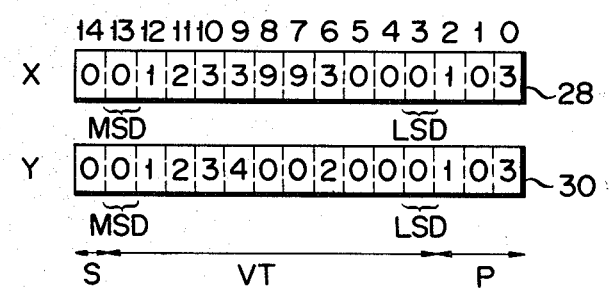
FIG. 3 is a schematic view of the constructions of X and Y registers shown in FIG. 1.

FIG. 3 schematically shows the constructions of the X and Y registers 28 and 30 of the memory section 26. Each of the registers 28 and 30 has a memory capacity of fifteen digits corresponding to the addresses in one row. Referring to FIG. 3, in each exponential memory area P covering the first to third digits on places which respectively correspond to the row addresses 0, 1 and 2 there are stored exponential data indicating the exponential portion of numeric data. In each mantissa memory area VT covering the fourth to fourteenth digits or places corresponding to the row addresses 3 to 13 there are stored mantissa data indicating the mantissa portion of numeric data. Of these row addresses 3 to 13, the digit corresponding to the row address 3 is the least significant digit (LSD) of the mantissa portion and the digit corresponding to the row address 13 is the most significant digit (MSD) of that mantissa portion. In each memory area for storing the plus or minus note as regards the mantissa portion which covers the fifteenth place or row address 14 there is stored the code which indicates such note.

There will now be described the numeric data display operation of the electronic desk top calculator having the foregoing construction.

Initially, it is first assumed that by way of example of given function g(x) is subjected to arithmetic operation convergently producing a result in turn. It is them assumed that the mantissa data "01233993000" obtained by a previous one of such arithmetic operations is stored in the mantissa memory area $X_{VT}$ of the X register 28 and that the mantissa data "01234002000" obtained by the immediately succeeding one of said arithmetic operations is stored in the mantissa memory area $Y_{VT}$ of the Y register 30. It is further assumed that the exponential data "103" indicating the numeric data "$10^3$" is stored in the respective exponential memory areas $X_p$ and $Y_p$ of the X and Y registers (28, 30). In this way, FIG. 3 illustrates the storage of the previous data in the X register 28 and the storage of the immediately succeeding data in the Y register 30.

Figure 4:
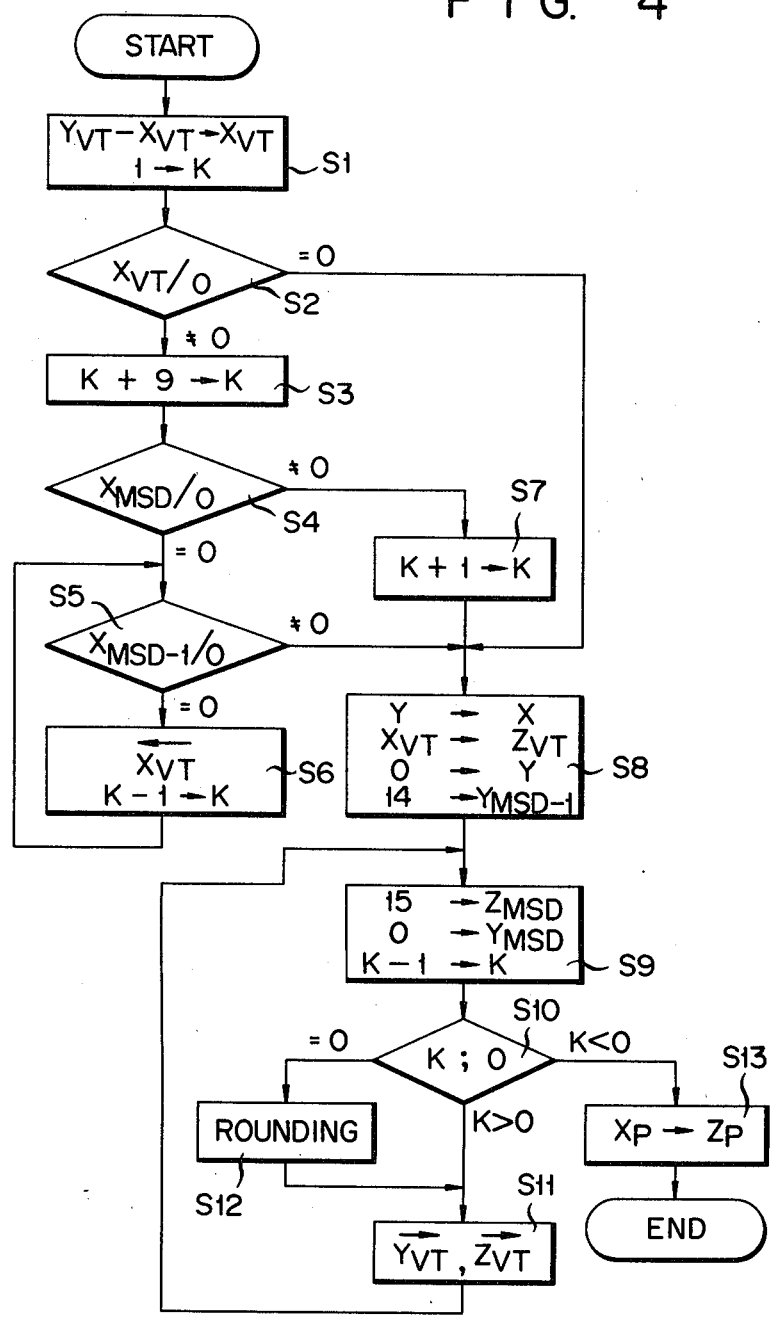
FIG. 4 is a flow chart showing the operation of the embodiment shown in FIG. 1.

FIG. 4 shows a flow chart of the operations which, after said previous data and immediately succeeding data have been respectively stored in the X and Y registers 28 and 30 as shown in FIG. 3, are to be executed for purpose of obtaining a reliable digit place number data from such both data and displaying it.

FIGS. 5A to 5E schematically show the contents of X, Y, Z and K registers in the operational steps $S_1$, $S_6$, $S_8$ and $S_9$ shown in FIG. 4.

In the step $S_1$ of FIG. 4 the mantissa data stored in the mantissa memory area $X_{VT}$ of the X register 28 is subtracted in the arithmetic-logic section 24 from the mantissa data stored in the mantissa memory area $Y_{VT}$ of the Y register 30, the result of this subtraction "00000009000" being written into the mantissa memory area $X_{VT}$ of the X register 28. Further, the data "1" is written into the K register 34. As a consequence, the storages of the data in the mantissa memory area $X_{VT}$ and K register 34 are as shown in FIG. 5A.

In the step $S_2$, it is judged whether or not the contents of the mantissa memory area $X_{VT}$ of the X register 28 are "0". Namely, it is judged whether or not the previous mantissa data is equal to the immediately succeeding mantissa data. When the former data has been judged to be not equal to the latter data, the operation is shifted to the step $S_3$.

In the step $S_3$, "9" is added to the content "1" of the K register 34, the result "10" being written into the K register 34.

Next, the operation in the step $S_4$ is executed. There it is judged whether or not the contents item of the most significant digit place $X_{MSD}$ in the mantissa portion of the X register 28 is "0", or whether or not the mantissa data is stored in the digit place $X_{MSD}$. When the contents item of that digit place $X_{MSD}$ is judged to be "0", the operation proceeds to the next step $S_5$.

In the step $S_5$ it is judged whether or not the contents item of the second most significant digit place $X_{MSD-1}$ is "0". When this judgement is made such that item is equal to "0", the operation proceeds to the next step $S_6$.

In the step $S_6$ the mantissa data items stored in the mantissa memory area $X_{VT}$ of the X register 28 are each shifted to the next higher place, and "1" is subtracted from the contents of the K register 34, the result being written into the K register 34. The operation returns to the step $S_5$.

In this way, the $S_5$ and $S_6$ operations are alternatingly carried out until the data of the second most significant digit place $X_{MSD-1}$ of the X register 28 ceases to be judged to be "0". In this embodiment, when the sixth operation of the step $S_6$ has been completed, as shown in FIG. 5B "09000000000" is stored in the mantissa memory area $X_{VT}$ of the X register 28 and "4" is stored in the K register 34. When the seventh operation of $S_5$ has been completed, the data of said second most significant digit place $X_{MSD-1}$ of the X register 28 is judged to be not "0". Thus, the operation goes ahead to the step $S_8$.

When in the said step $S_4$ it has been judged that the data of the most significant digit place $X_{MSD}$ of the X register 28 is not "0", the data "1" is added to the contents "10" of the K register 34, the result "11" of this addition being written into the K register 34. The operation goes to the step $S_8$.

In the step $S_8$, the immediately succeeding numeric data "001234002000103" stored in the Y register 30 of the memory section 26 is transferred to the X register 28. And the immediately succeeding mantissa data "01234002000" now stored in the mantissa memory area $X_{VT}$ of the X register 28 is transferred to the mantissa memory area $Z_{VT}$ of the Z register 32. Thus, the data "0" is written into all digit places of the Y register 30. Thereafter, the data "14" as a decimal point code is stored in the second most sgnificant digit place $Y_{MSD-1}$ of the Y register 30. FIG. 5C shows the data storage in the Z, Y and K registers when the operation of the step $S_8$ has been executed. That is to say, the mantissa data memory area $Z_{VT}$ of the Z register 32 is stored with "01234002000", the mantissa data memory area $Y_{VT}$ of the Y register 30 is stored with "014000000000", and the K register 34 is stored with "4".

Next, the operation of the step $S_9$ is executed. In this step, the data "15" serving as a blanking code is written into the most significant digit place $Z_{MSD}$ of the Z register 32 and "0" is written into the most significant digit place $Y_{MSD}$ of the Y register 30. "1" is subtracted from the digit-place number data of the K register 34, the result of this subtraction being again written into the K register 34.

Next, the operation of the step $S_{10}$ is executed. In this step, it is judged whether or not the contents item of the K register 34 is "0", or whether or not such contents item is greater than "0", or whether or not such contents item is smaller than "0". When the judgement has been made that said contents item is greater than "0", the operation goes to the step $S_{11}$.

In the step $S_{11}$, the said immediately succeeding mantissa data "01234002000" stored in the mantissa data memory area $Z_{VT}$ of the Z register 32, as well as the decimal point code stored in the mantissa data memory area $Y_{VT}$ of the Y register 30 are each shifted to the next lower place. Thus, the operation of the step $S_{11}$ goes back to the step $S_9$.

In the above-mentioned way, the operations of the steps $S_9$, $S_{10}$ and $S_{11}$ are sequentially repeatedly carried out. In each step $S_9$ under such repeated operations, the blanking code "15" is written into the most significant digit place $Z_{MSD}$ of the Z register 32, the data "0" is written into the most significant digit place $Y_{MSD}$ of the Y register 30, and the data "1" is subtracted from the digit place number data of the K register 34.

FIG. 5D shows the data storage in the Z, Y and K registers after the operation of the step $S_9$ has been executed four times. That is, the mantissa data memory area $Z_{VT}$ of the Z register 32 is stored with "15 15 15 15 1 2 3 4 0 0 2", the mantissa data memory area $Y_{VT}$ of the Y register 30 is stored with the data "0 0 0 0 14 0 0 0 0 0", and the K register 34 is stored with the data "0". Subsequently, the operation of the step $S_{10}$ is executed and in this step it is judged that the digit place number data of the K register 34 is "0". Thus, the operation is shifted to the stage of the step $S_{12}$.

In the step $S_{12}$, the data stored in the least significant digit place $Z_{LSD}$ in the mantissa portion of the Z register 32 is rounded in the arithmetic-logic section 24 by raising 5 and over in that place to 1 in the next higher place and reducing the rest to zero, the result of said rounding being written into the mantissa data memory area $Z_{VT}$ of the Z register 32. Subsequently, the operation is shifted to the step $S_{11}$, with a consequence that the data of the mantissa memory area $Z_{VT}$ of the Z register 32 as well as the data of the mantissa memory area $Y_{VT}$ of the Y register 30 is each shifted to the next lower place. Accordingly, after the numeric data "2" of the least significant place $Z_{LSD}$ of the Z register is subjected to the above rounding operation, the resulting data of this digit place is shifted to the next lower place and is omitted. Then, the operation of the step $S_9$ commences.

FIG. 5E shows the data storage in the Z and Y registers after the step $S_9$ operation has been executed. That is, the mantissa data memory are $Z_{VT}$ of the Z register 32 is stored with the data "15 15 15 15 15 1 2 3 4 0 0," while the mantissa data memory area $Y_{VT}$ of the Y register 30 is stored with the data "0 0 0 0 0 14 0 0 0 0."

Then, the operation of the steps $S_{10}$ is carried out. In this step, the digit-place number data of the K register 34 is found to be smaller than "0," and the operation proceeds to the step $S_{13}$.

In the step $S_{13}$, that exponential data of said immediately succeeding numeric data which is stored in the exponential memory area $X_p$ of the X register 28, is transferred to the exponential memory area $Z_p$ of the Z register 32. As a consequence, the data "15 15 15 15 15 1 2 3 4 0 0 1 0 3" is stored in the Z register 32. This data is transferred to the display buffer 36. Further, the decimal point code stored in the Y register 30 is transferred to the display buffer 36.

The display section 38 displays the numeric data "1.2 3 4 0 0 X $10^3$" in accordance with the data stored in the display buffer 36.

In this way, according to this embodiment display is made of only data of reliable digit-place number.

In the above-mentioned embodiment, construction is made so that in the step $S_{12}$ the rounding operation as mentioned above is carried out, but this invention is not limited to such construction. The invention also permits a construction which is capable of other rounding operations such as that of raising all figures of 1 to 9 in one place to 1 in the next higher place, that of reducing to zero all figures of 1 to 9, etc.

Further, in the above-mentioned embodiment, use is made of the X, Y and Z registers (28, 30 and 32) having a storing capacity of fifteen digit places. But this invention also permits the use of the X, Y and Z registers having another storing capacity. In such a case, however, change should be made to the numeric value which is set to, for example K register 34.

Various changes or modifications can of course be made to the invention without departing from the spirit and scope of the same.

What is claimed is:

1. A round-off apparatus for data processors which carry out a series of arithmetic operations to approach a solution with increasing degrees of accuracy, the rounding-off apparatus comprising:

first storage means for storing the (i)th result of a series of arithmetic operations of a data processor by which a solution is gradually approached with increasing degrees of accuracy;

second storage means for storing the (i+1)th result of said series of arithmetic operations;

detecting means coupled to said first and second storage means for computing the difference between said (i)th result and said (i+1)th result and detecting the highest non-zero digit (n) of the computed difference;

third storage means coupled to said detecting means for storing said highest non-zero digit (n); and rounding-off means coupled to said second and third storage means for rounding-off said (i+1)th result to the (n+1)th digit.

2. The round-off apparatus of claim 1, further comprising delay means coupled to said rounding-off means for displaying said rounded-off (i+1)th result only from the most significant digit to the (n+1)th digit.

3. The round-off apparatus of claim 1, wherein said rounding-off means rounds-off the numeral in the (n)th digit of said (i+1)th result and drops the numerals in the (n)th digit and the lower digits to make said (i+1)th result effective from the most significant digit to the (n+1)th digit.

4. The round-off apparatus of claim 1, wherein:

said detecting means includes means for subtracting the contents of said first storage means from the contents of said second storage means to produce a difference; means for storing said difference in said first storage means; means for shifting the contents of said first storage means towards the most significant digit one digit at a time until a non-zero numeral occurs in the next most significant digit following the most significant digit; and means for determining the number which corresponds to the highest non-zero digit (n) and for storing said number in said third storage means; and said rounding-off means includes a fourth storage means for storing the contents of said second storage means; means for shifting the contents of said fourth storage means towards the least significant digit in accordance with the number stored in said third storage means; means for rounding-off the least significant digit which corresponds to the (n)th digit of said (i+1)th result; and means for shifting the contents of said fourth storage means only by one digit towards the least significant digit to provide only the significant numerals from the most significant digit to the (n+1)th digit of said (i+1)th result.

* * * * *